United States Patent [19]

Kilcher

[11] 4,263,493
[45] Apr. 21, 1981

[54] SPARK EROSION CUTTING APPARATUS WITH CONTROLLED FLUSHING MEDIUM FLOW

[75] Inventor: Beat Kilcher, Ascona, Switzerland

[73] Assignee: A.G. für industrielle Elektronik AGIE, Losone, Switzerland

[21] Appl. No.: 954,638

[22] Filed: Oct. 25, 1978

[30] Foreign Application Priority Data

Apr. 18, 1978 [CH] Switzerland ............... 4136/78

[51] Int. Cl.³ .............................................. B23P 1/00
[52] U.S. Cl. ............................... 219/69 W; 219/69 D
[58] Field of Search ............... 219/69 M, 69 D, 69 W; 204/129.6

[56] References Cited

U.S. PATENT DOCUMENTS

| | | | |
|---|---|---|---|
| 3,928,163 | 12/1975 | Ullmann et al. | 219/69 D |
| 4,052,583 | 10/1977 | Inoue | 219/69 W |

FOREIGN PATENT DOCUMENTS

| | | | |
|---|---|---|---|
| 526365 | 9/1972 | Switzerland . | |
| 315557 | 11/1971 | U.S.S.R. | 219/69 W |
| 210970 | 6/1977 | U.S.S.R. | 219/69 W |

Primary Examiner—C. C. Shaw

Attorney, Agent, or Firm—Frishauf, Holtz, Goodman & Woodward

[57] ABSTRACT

The disclosed method includes forcing a flushing medium through the work zone in the workpiece in one direction by providing a flushing chamber to one side of the workpiece where the workpiece is being machined.

Also disclosed is an apparatus for practicing the method. The apparatus includes means for forming a chamber on one side of the workpiece and for effectively covering portions of the chamber walls which are cut by the wire electrode as the machining progresses, to maintain sufficient flushing pressure in the chamber. In one embodiment, a chamber wall mamber is spaced from the workpiece by a gasket ring and flushing fluid is forced into the space between the two members, so that it is forced from there out from that space through the machining zone in the workpiece. Alternatively, at one of the guide heads there is provided a recess and a ring-shaped sealing diaphragm, so that when the sealing diaphragm is pressed against the workpiece, a flushing chamber is formed from which the flushing fluid can be forced through the workpiece. A similar chamber can be provided on the opposite side of the workpiece at the other guide head to receive the flushing fluid from the workpiece.

3 Claims, 4 Drawing Figures

SPARK EROSION CUTTING APPARATUS WITH CONTROLLED FLUSHING MEDIUM FLOW

BACKGROUND OF THE INVENTION

The invention relates to a process and an apparatus for flushing the machining area during spark-erosive cutting, also known as EDM (electrical discharge machining) with an undisturbed flushing stream.

BACKGROUND AND PRIOR ART

In the method of spark-erosive cutting with a wire electrode, such as e.g. described in No. 13 of Technische Rundschau of Apr. 3, 1970, pages 9 to 13 (Hallwag-Verlag, Berne), in much the same way as for spark-erosive counterboring, the machining area is either submerged in a dielectric working medium (dielectric) or the working medium is supplied laterally to the machining area by means of flushing jets. This working medium serves to both longitudinally and transversely geometrically constrict the electrical path of the individual discharges, thereby increasing the erosion effectiveness of the sparks. At the same time, the working medium is utilized for removing the eroded particles produced and the gases formed.

In installations where spark-erosive cutting is performed in a bath, there is always the difficulty of having a dielectric with initially controlled conductivity characteristics at the relatively small machining zone. In operation, the conductivity of the medium is rapidly changed due to the admixing of gas and eroded particles from the machining process. As the physical characteristic quantities have an effect on the machining gap width via the ignition quality and consequently on the precision of the machined workpiece, it is necessary to control the flushing conditions in the machining area to bring about accurate machining. To satisfy this requirement, the above-mentioned jet flushing process was introduced. A process of this type with lateral flushing ducts in conjunction with guide means for the wire electrode has been proposed: U.S. Pat. No. 3,928,163, Ullmann et al, assigned to the assignee of this application to which British Pat. No. 1,475,725 corresponds, describes a further development of the flushing jet process by coaxial surface flushing around the wire electrode, which leads to a further improvement in the flushing conditions in the machining area. All the described processes of machining in the bath, the simple flushing of the machining area, the guided flushing of the machining area, and finally, the coaxially guided flushing of the machining area have the common drawback that the area is either inadequately flushed, as in the first of the above processes, or that through the use of a plurality of flushing jets as in the more advanced processes the flushing jets which strike against one another from different directions cause mutual disturbances in the machining area. It is, in particular, not feasible to internally control the resulting gases and the erosion removal in the case of very thick workpieces. This is due firstly to the fact that the flushing jets can give rise to a damming up action due to their counter-jet action and secondly to the fact that due to the gases formed and the admixed eroded particles, there can be no further control possibilities for the state of conductivity in the very narrow slots. In addition, through the uniting of two flushing jets from different directions, turbulence can occur, and due to accelerations of flow, low pressure areas can form which give the gas a particularly high expansibility.

SUMMARY OF THE INVENTION

It is an object to obviate the above-described difficulties connected with the flushing control in that the flow through the machining area between wire electrode and workpiece is controlled and in only one direction, whereby a more reliable and rapid flushing medium exchange and a more clearly defined removal of gases and eroded particles are ensured.

According to the present invention, a flushing stream is supplied only from one side of the workpiece and is brought by mechanical means to the machining area in such a way that in the cut workpiece it flows only from bottom to top, or vice versa.

DETAILED DESCRIPTION OF THE PREFERRED EMBODIMENTS

Figure 1:
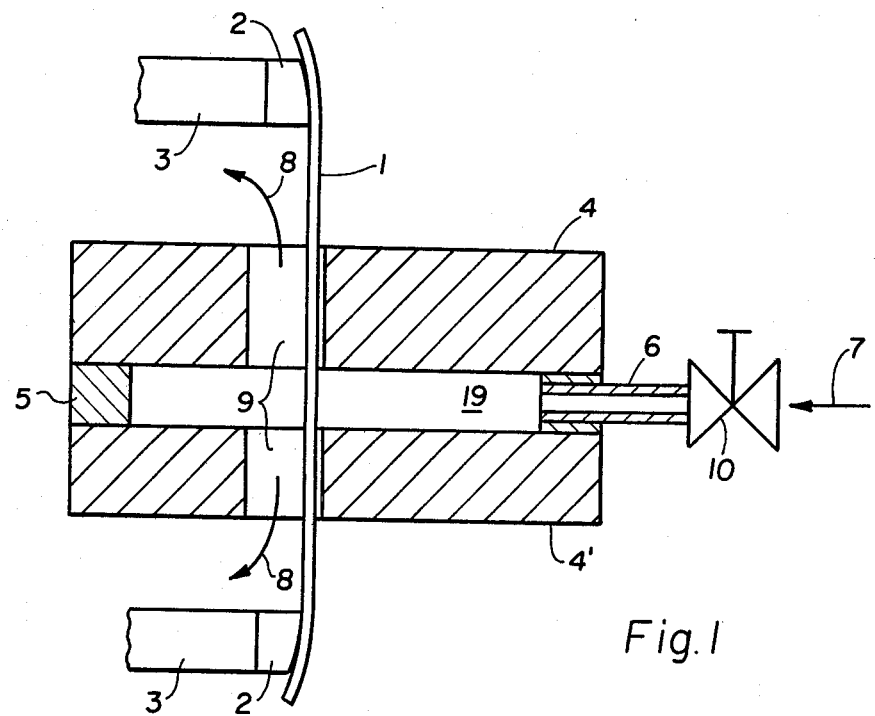
FIG. 1 is a partially schematic side, sectional view of a portion of a machining apparatus in accordance with one preferred embodiment of the present invention. It shows a workpiece situated between two guide heads for a wire electrode. Means are provided for forcing a flushing medium through the workpiece in the machining zone in one direction.

FIG. 1 shows the wire electrode 1 necessary for the process being guided in a geometrically defined position and generally under tension on wire guide heads 2. A detailed description of these guide heads 2 is contained for example in U.S. application Ser. No. 791,055 filed Apr. 26, 1977, Ullmann et al, assigned to the assignee of this application, now U.S. Pat. No. 4,205,212. Strip electrodes may also be used instead of wire electrodes. The wire guide heads are connected by means of supporting arms 3 with the structure of a machine tool. The workpieces 4 are fixed to a cross-table (not shown in the drawings) of this machine tool, which performs the coordinate movements necessary for machining and which is generally controlled by a numerical control mechanism. The electrical machining pulses are supplied to the machining area between two workpieces 4, 4' and wire electrode 1 by spark generator, not shown. The two workpieces 4, 4' are jointly fixed to the machine tool and are spaced by a gasket ring 5, which must not overlap the machining geometry. Thus, an internal flushing area is formed between the two workpieces 4, 4'. A dielectric flushing medium is introduced into a chamber 19 leading to the flushing area under pressure in direction 7 through a flushing connection 6 controlled by a valve 10. Due to the flushing pressure, the medium subsequently travels through machining area 9 between wire electrode 1 and workpieces 4, 4' in discharge direction 8. It is important that as a result of the arrangement of the machining area flushing takes place only in a clearly defined flow direction.

It is naturally possible to replace the indicated compact workpieces 4, 4' by fixing a group of individual plates on either side, which is frequently used in practice during the manufacture of prototype parts. For using the described flushing process, it is also not necessary for the workpieces 4, 4' to have the same thickness on either side of the internal flushing area. The process can also be used if only a very thin plate is used on one side which, after machining, may have no technical use, so that a real workpiece is placed only on one side of the internal flushing chamber.

From the process standpoint, it is also possible to reverse the flushing directions 7 and 8, e.g. by drawing in instead of flushing out at valve 10. However, in practice this reverse flushing direction is more difficult to achieve.

In FIG. 1, workpieces 4, 4' and gasket ring 5 are shown cut, and this is indicated by the hatching. Wire electrode 1 has already cut a slot 9 into the workpiece, and this can be seen on the non-hatched surface. When the process is used in actual practice, an ever larger escape possibility for the flushing medium from the internal flushing chamber is provided as a function of the length of cut. If, in the case of very large machining geometries, this leak becomes so large that flushing of the machining area is impaired, the operator can without difficulty, close the already cut slot 9 again by briefly stopping machining and by plugging the cut, e.g. by sticking, metal sheets or electrically non-conductive materials to either side, as schematically shown at 20, FIG. 3.

Figure 2:
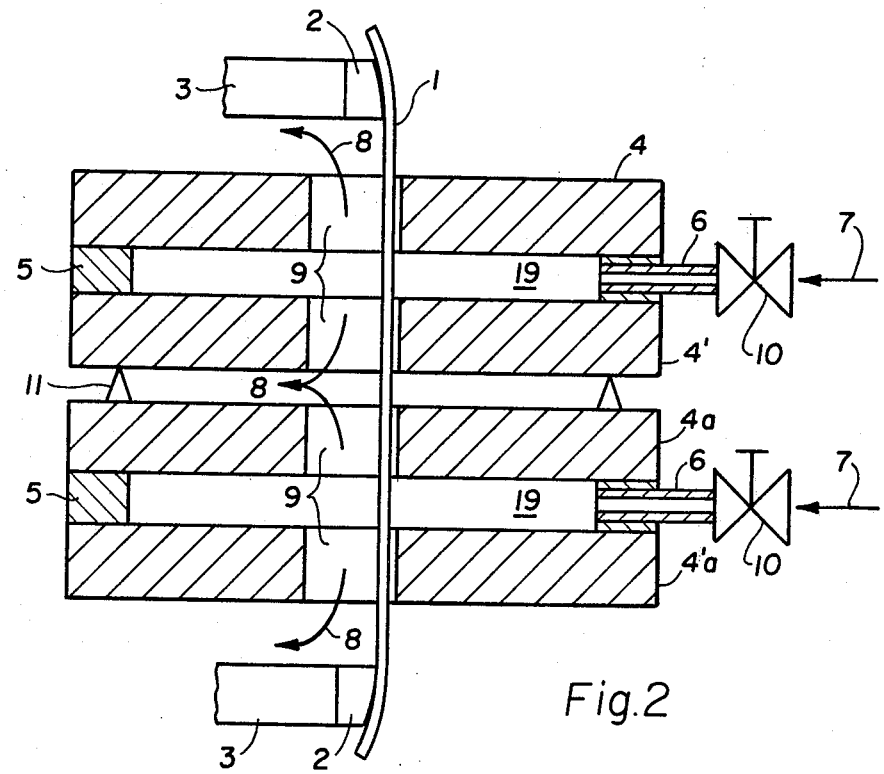
FIG. 2 is a partially schematic side, sectional view of the apparatus of FIG. 1 and with a plurality of workpieces between the guide heads, with each of the workpieces having a flushing medium forced through it in one direction.

In principle the arrangement of FIG. 2 is the same as that of FIG. 1, but the wire guide heads 2 are spaced further apart at the supporting arms 3, so that a multiple arrangement of workpiece pairs 4, 4'; 4a, 4'a can be fixed to the machine tool table. Spacers 11 ensure that there is an adequate space between each pair for the free discharge of the flushing streams 8.

Figure 3:
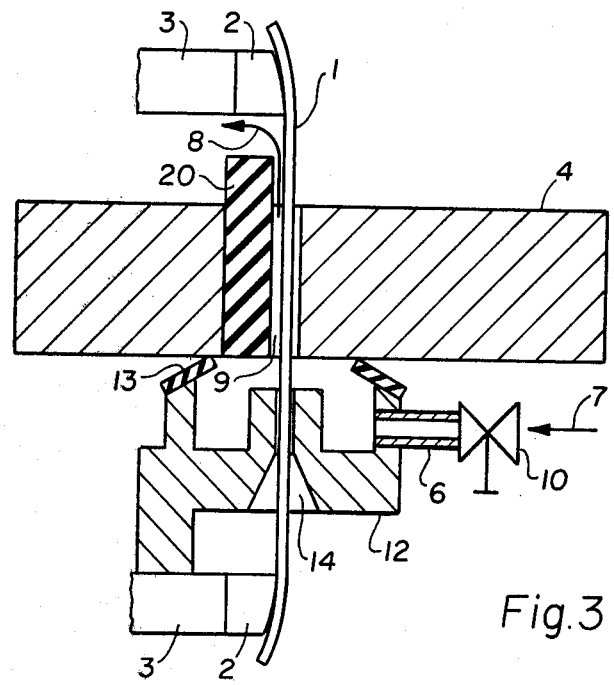
FIG. 3 is a partially schematic side, sectional view of a portion of a machining apparatus in accordance with another preferred embodiment of the present invention and showing a workpiece situated between two guide heads for a wire electrode, one of the guide heads being provided with means for forcing a flushing medium through the workpiece in one direction.

FIG. 3 shows an arrangement in which only a single workpiece 4 is fixed to the machine tool table in place of the workpiece pairs of FIGS. 1 and 2. In this arrangement, the action of flushing in one direction is obtained by fixing a flushing chamber 12 to a supporting arm 3 on the top or bottom of the workpiece, thus forming a flushing area beneath the workpiece. This flushing area is sealed with respect to workpiece 4 by a sealing diaphragm 13. No sealing diaphragm is necessary if the distance between flushing chamber 12 and workpiece 4 can be maintained with such a small gap that only an insignificant leakage results. Flushing chamber 12 has a flushing connection 6 by means of which the flushing medium can be supplied in flushing direction 7, controlled by valve 10, so that it then leaves the workpiece in the outflow direction 8 through the cut slot 9. To facilitate the introduction of wire electrode 1 into flushing chamber 12 a tapered introduction bore section 14 is provided which issues into a very small passage bore, whose length is such that there can only be a very small liquid leakage.

An advantage of the arrangement of a flushing chamber according to FIG. 3 compared with the solutions with an internal flushing area according to FIGS. 1 and 2 is that the diameter of the flushing arrangement can be kept smaller, so that water consumption is reduced. The slot 9 cut by spark erosion need not remain in the connecting area of the sealing diaphragm 13. If, due to the already cut slot 9 which has passed outside the connecting area of the sealing diaphragm, there is too large a leak, water consumption and flushing action can be improved through closing the already formed slot again with a sealing material 20 during a short work stoppage. This sealing material 20 can be used both for recuring the inner part, which otherwise, with a closed contour would fall out, and at the same time may form an electrical conductive connection to the inner part if a metal element is used. The formation of the flushing area and the selection of the geometrical position of the flushing connection 6 takes place in such a way that the flushing stream in slot 9 is as turbulence-free as possible and is coaxial to the wire electrode 1. This also ensures that the flushing stream is mainly applied to the machining area between workpiece 4 and wire electrode 1 and does not escape too rapidly through the already cut slot 9.

In accordance with the requirements discussed in the above referred to U.S. application Ser. No. 791,055 regarding the supply of generator connections to wire electrode 1 and workpiece 4, the flushing chamber arrangement, particularly with its sealing diaphragm 13, can simultaneously be constructed in such a way that these requirements concerning the electrical connection can be realised with the same apparatus.

Figure 4:
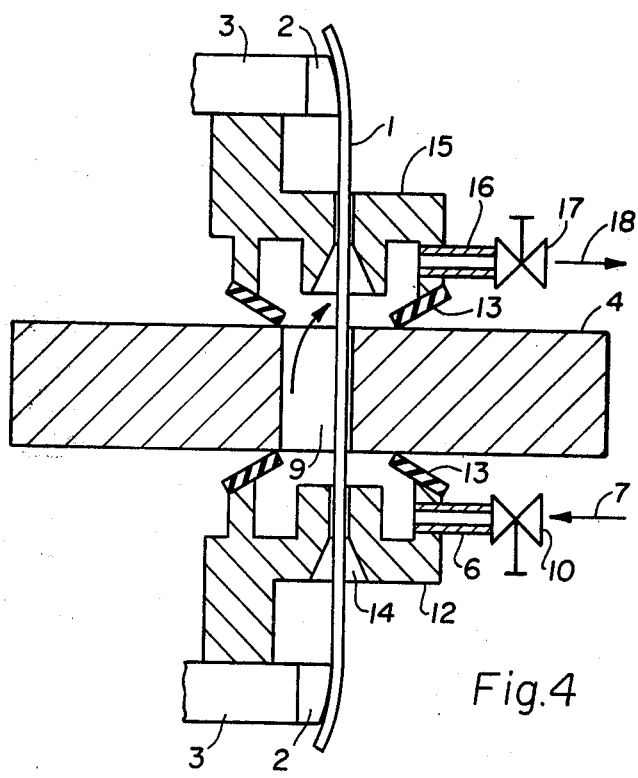
FIG. 4 is a partially schematic side, sectional view of the apparatus of FIG. 3 and with the other guide head provided with a means for receiving the fluid forced through the workpiece by the first guide head.

FIG. 4 supplements the construction of FIG. 3 by a backpressure chamber 15 arranged on the opposite side to flushing chamber 12 and which is also fixed to a supporting arm 3. In the same way as for flushing chamber 12, the flushing area of back-pressure chamber 15 is sealed relative to the workpiece 4 by a sealing diaphragm 13. The flushing flow 8 from slot 9 passes through discharge connection 16 and trottle valve 17 to a flushing medium return flow path 18. For the introduction of the wire electrode, back-pressure chamber 15 once again has a tapered introduction bore section 19 issuing into a narrow bore, which to the greatest possible extent prevents the outflow of flushing medium.

Through the use of a back-pressure chamber 15, a pressure level can be maintained in the area of slot 9 such that the gas bubbles formed through the decomposition of the working medium only acquire a very small volume and consequently disturb machining to only a minimum degree.

According to the objectives of the aforementioned copending U.S. patent application Ser. No. 791,055, Ullmann et al the functions of wire guidance with the wire guide heads 2 can be completely integrated into the flushing chamber arrangement. In addition to the advantages discussed relative to the individual drawings, when using the most sophisticated version according to FIG. 4, an apparatus can be obtained in which, with the exception of very minor leaks, the supply and discharge of the working medium take place in a completely controlled manner, in which in the desired manner the guide means are located very close to the machining area and in which the supply of electric power can take place with high frequencies without causing disturbing induction fields coaxially to the wire.

I claim:

1. Apparatus for machining of workpiece by spark-erosion cutting with a wire electrode (1) and supplying a flushing medium to the machining area from one side of the workpiece, so that the flushing medium flows in a controlled manner in one direction through the machine in an area comprising

- a pair of flat members (4, 4');
- a gasket ring (5) spacing said members from each other, at least one of said members forming the workpiece, the space between the members free from the gasket ring defining a flushing chamber (19);
- means (2, 3) guiding the wire electrode (1) to pass through the flushing chamber;
- means (6, 7) supplying a flushing medium under pressure to the chamber;
- and means (10) controlling the flow of the pressurized flushing medium to the chamber, and hence the flow of the medium from the flushing chamber out through the workpiece adjacent the wire electrode, wherein both said members comprise workpieces to form a workpiece pair (4, 4'), the workpieces of the pair being substantially parallel to each other and spaced from each other by said gasket ring (5) to provide said flushing chamber (19) between them.

2. Apparatus according to claim 1 wherein a plurality of workpiece pairs (4, 4'; 4a, 4'a) are located parallel to each other;

and means (11) are provided spacing adjacent workpieces of different pairs from each other to provide a space therebetween for the flushing medium to exit from the respective machining areas.

3. The apparatus according to claim 1 and comprising means (20) for closing off a portion of a cut made in the workpiece and the flat member to reduce the passage of flushing medium through that portion and to thereby increase the passage of flushing medium through the portion of the cut immediately adjacent the wire electrode.

* * * * *